United States Patent [19]

Gaylord

[11] 4,095,314
[45] Jun. 20, 1978

[54] SHOCKLOAD RESISTANT CANOPY RELEASE

[75] Inventor: John A. Gaylord, San Diego, Calif.

[73] Assignee: H. Koch & Sons, Anaheim, Calif.

[21] Appl. No.: 776,300

[22] Filed: Mar. 10, 1977

[51] Int. Cl.² .............................................. A44B 11/25
[52] U.S. Cl. .................................................. 24/230 A
[58] Field of Search ....... 24/230 A, 230 AS, 230 AT, 24/205.17, 73 PH, 230 AP

[56] References Cited

U.S. PATENT DOCUMENTS

| | | | |
|---|---|---|---|
| 2,504,125 | 4/1950 | Hight | 24/73 PH |
| 3,555,634 | 1/1971 | Brown | 24/230 A |

Primary Examiner—Kenneth J. Dorner
Attorney, Agent, or Firm—George B. White

[57] ABSTRACT

The Canopy Release is for the purpose of connecting the webbings from a canopy or parachute to a harness worn by a person. The device includes a male connector member insertable in a female connector member and a releasable locking device for locking the male member in the female member. The male member is connected to one webbing and it has a prong having a keeper recess in at least one edge and it is inserted into a pocket in the female member; a lock in the female member is moveable into and out of the pocket to interlock with the keeper recess and to release the same; a pin in the lock is journalled in the female member and in a cover plate having a substantially U-shaped slot therein; a manipulating frame is connected to the pin so as to turn the pin when the manipulating frame is turned; a guide extends from the manipulating frame into the U-shaped slot and is resiliently urged into the respective ends of the U-shaped slot thereby to prevent a turning movement of the frame until the guide is moved into the curved middle portion of the U-shaped slot; a manipulating handle is resiliently concealed in the manipulating frame slides the guide out of the respective ends of the U-shaped slot and into the curved portion thereby to permit the turning of the manipulating frame for withdrawing the lock from or turning it into the keeper recess in the prong of the male member.

6 Claims, 6 Drawing Figures

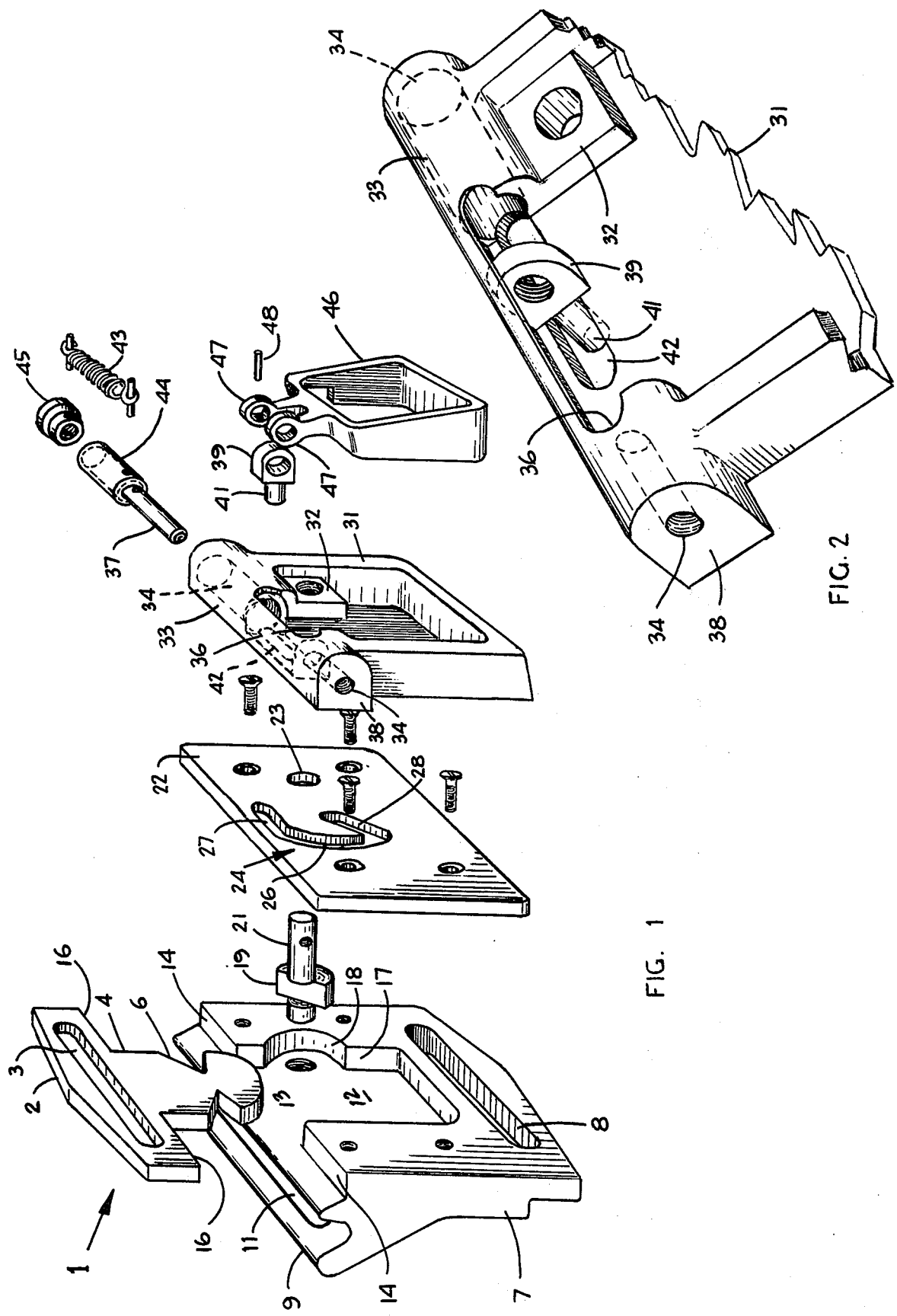

SHOCKLOAD RESISTANT CANOPY RELEASE

BACKGROUND OF THE INVENTION

The positive locking of the releasable strap connectors to prevent accidental canopy release is a continuing problem because the safety of personnel is involved and accidental release of webbing connected to a parachute is usually fatal. Accidental disconnecting of webbing is frequently caused by a shock which inadvertently unlocks or releases the connectors. Also, accidental striking of a portion of the connector or the connector being caught in some other object can cause accidental release.

The primary object of this invention is to provide releasable webbing connectors so locked together that the manipulating parts are positively locked against any accidental movement from either the locking or the released position, yet can be easily manipulated.

A further object of the invention is to provide in releasable strap connectors a manipulating and locking device which can be operated by one finger and which can be easily found without looking at the connectors, and which also requires the operator to continuously engage the device throughout the releasing operation or throughout the locking operation, and which may be inter-locked in canopy release body in either front or back position; the device is also adapted to operate in one way lockup.

A further object of the invention is to provide an adapter in a canopy release which is connected by a webbing to the usual canopy release as an auxiliary release and which can be positively locked and yet is simple in construction with the minimum number of parts, and which has concealed operating parts protected against accidental engagement.

DESCRIPTION OF FIGURES

FIG. 1 is a developed view of the parts of the webbing connectors.

FIG. 2 is a fragmental perspective view of the manipulating frame and the guide device.

DETAILED DESCRIPTION

Figures 3, 4:
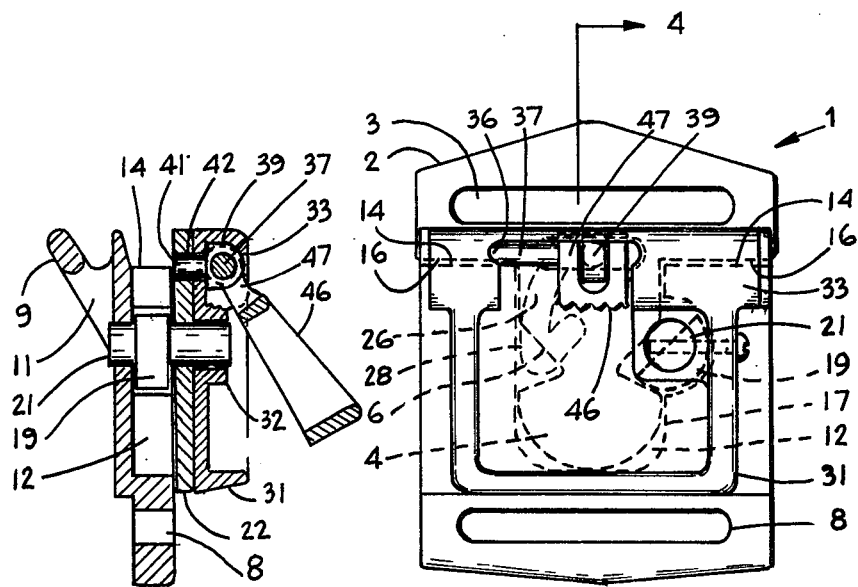
FIG. 3 is a front view of the connector members connected.
FIG. 4 is a cross-sectional view of the female connector member, the section being taken on lines 4—4 of FIG. 3.
Figure 6:
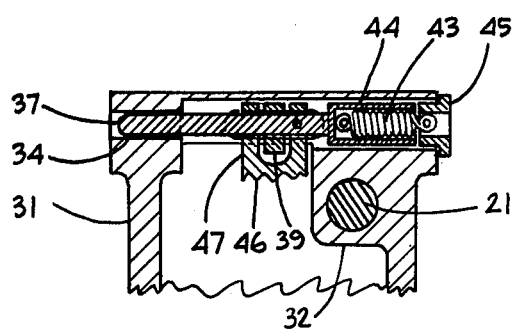
FIG. 6 is a fragmental sectional view of the guide device in the female connector.

A male member body 1 has a cross head 2 with a slot 3 for webbing. The prong 4 of the body 1 is flat and it has at least one keeper recess 6 in an edge thereof.

Figure 5:
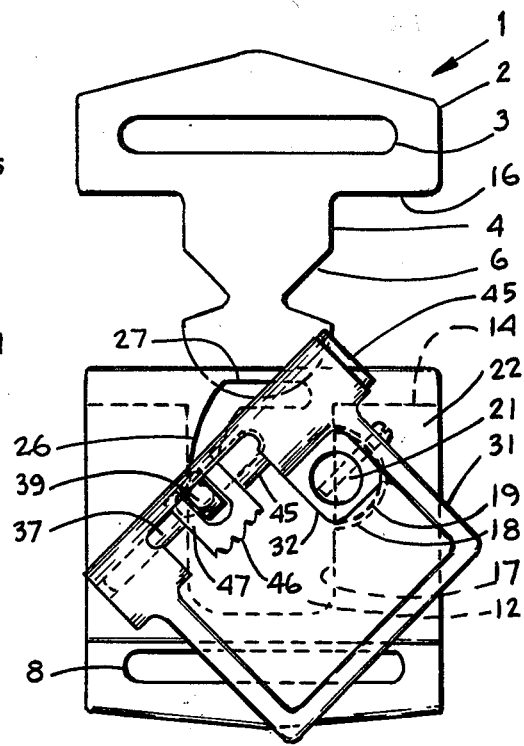
FIG. 5 is a front view of the connectors released.

The female connecting member has a base body 7 which has a slot 8 at its lower end for engagement by another webbing. In this illustrative embodiment there is an additional ear 9 extending from the back of the base body 7 which also has a slot 11 therein to accomodate additional webbing when required. The base body 7 has a pocket 12 with an opening 13 at its top so as to accomodate the prong 4 of the male body 1. Adjacent the opening 13 of the pocket 12 are opposite shoulders 14 upon which rest the lower shoulders 16 of the elongated head 2 of the male connecting member when inserted into the pocket 12. In one side 17 of the pocket 12 is a side recess 18 extending into the body to a depth to accommodate a cam-shaped lock 19. A pin 21 extends from each side of the lock 19 and through a cover plate 22 secured over the pocket 12. The pin 21 is rotatable so that as it is turned in one direction as shown in FIG. 3, the lock 19 projects into the adjacent registering keeper recess 6 of the prong 4 thereby locking it into connected position. By turning the pin 21 in a counter-clockwise direction to the position shown in FIG. 5, the lock 19 is rotated out of the keeper recess 6 and into the side recess 18 thereby releasing the prong 4.

A hole 23 through the coverplate 22 registers with the pin 21 and the pin extends beyond the cover plate 22 and fastened into a hole in mounting block 32 of manipulating frame 31. The plate 22 has a double bayonet slot 24 therein, namely the slot 24 is generally U-shaped with a curved or arcuate middle portion 26 centered about the pin 21, and a locking end portion 27 at the upper end and another locking end portion 28 at the lower end of the middle portion 26.

A manipulating frame 31 has a mounting block 32 thereof suitably fastened on the pin 21 so that when the manipulating frame 31 is turned the pin 21 turns with it and accordingly turns the lock 19 either into or out of the pocket 12.

The top edge of the manipulating frame 31 is formed into an enlarged hub 33 which has a passage 34 therethrough. The middle portion of the hub 33 is cut away to form a recess 36 which is in registry with the slot 24. A shaft 37 extends through the passage 34 and through an end 38 of the hub 33 and is slidable and rotatable therein. On the shaft 37 is a head 39 of a guide 41. The guide 41 is so spaced from the hole in block 32 that when the mounting block 32 is mounted on the pin 21 the guide 41 projects into the slot 24. A longitudinal slot 42 through the bottom of the recess 36 permits linear sliding of the guide 41 in the slot 24 for shifting into the ends 27 or 28 of the double bayonet slot 24. A tongue and tension spring 43 in an enlarged cylinder 44 on the end of the shaft 37 normally urges the shaft 37 away from the hub end 38. A cap 45 fits into the outer end of the cylinder 44 and anchors the adjacent end of the spring 43.

A manipulating handle 46 is concealed in a cavity of the manipulating frame 31. The handle 46 is in the form of a ring. Bearing lugs 47 extend from the top of the manipulating handle 46 and are secured to the shaft 37 by a pin 48. The spring 43 also turns the shaft 37 and thereby keeps the handle 46 in the cavity of the manipulating frame 31. The bearing lugs 47 straddle the head 39 of the guide 41, so that when the manipulating handle 46 is pulled out of the cavity then it can be pulled to the left viewing FIG. 3, namely so as to shift the shaft 37 and move the guide 41 from the end of the respective slot ends 27 or 28 thereby to bring the guide 41 into registry with the curved portion 26 and allow the rotating of the handle 46 and the manipulating frame 31 in the respective directions for moving the lock 19 into locking or unlocking positions respectively.

The assembled device is shown in interlocking position in FIG. 3. In order to release this adapter, the operator pulls the handle ring 46 out of the cavity 47 and pulls it so as to slide the guide 41 to the curved portion 26 of the double bayonet slot 24. Then by exerting a turning force on the handle 46 in a contra-clockwise direction viewing FIG. 3 the entire frame 31 is turned while the guide 41 rides in the curved slot portion 26 from the top bayonet slot 27 downwardly thereby turning the pin 21 and the lock 19 also in a contra-clockwise direction so that by the time the guide 41 reaches the lower bayonet slot 28 the lock is completely withdrawn from the keeper recess 6 of the prong 4 and into the side recess 18 thereby disconnecting and releasing the connectors. Then by releasing the handle ring 46, the spring 43 returns the shaft 37 to its initial position thereby moves the guide 41 to the end of the lower bayonet slot 28 and locks the manipulating frame 31 in the connector releasing attitude. The handle ring 46 is returned to its initial position into the cavity 47 by the shaft 37 to which it is secured by a pin 48.

For interlocking the male and female members, the handle ring 46 is again pulled out of the cavity and pulled to shift the shaft 38 and thereby slide the guide 41 out of the lower bayonet slot 28 and into registry with the curved slot portion 26. Then by further turning the handle 46 in a clockwise direction viewing FIG. 5, the manipulating frame 31 is turned clockwise while the guide 41 travels to the upper bayonet slot 27 and the lock 19 is turned into projecting position interlocking with the adjacent keeper recess 6. Then the handle 46 is released, the spring 43 returns the shaft 37 to the initial position locking the guide 41 into the top bayonet slot 27, and the handle 46 snaps into the cavity 47 as heretofore described, and the connectors are positively interlocked.

I claim:

1. In a webbing connector,
a male connector member,
a female connector member having a pocket therein,
a part of said male connector member being insertable into said pocket and having a keeper recess therein,
a lock in said female connector projectable into said recess for locking said connector members together,
a manipulating member on said female member for moving said lock into and out of said recess at will,
and locking means to lock said manipulating member in the locking position of said lock,
means to rotatably hold said manipulating member on said female member,
means to translate the rotating motion of said manipulating member into moving said lock into and out of said keeper recess at will,
said locking means including a guide element on said female body adjacent said manipulating member,
a guide on said manipulating member coacting with said guide element,
said guide element having a middle portion substantially concentric with the center of rotation of said manipulating member, and having an end portion at each end of said middle portion extending at an angle to the middle portion to block said guide from movement about said center,
and manipulatable means to shift said guide out of the respective end portions and to said middle portion thereby to free said manipulating member for rotating manipulation.

2. The webbing connector specified in claim 1, and resilient means to urge said guide into said respective end portions for preventing rotation of said manipulating member.

3. The webbing connector specified in claim 1, and a handle on said manipulating member,
and resiliently yieldable means holding said handle concealed in inoperative position in said manipulating member.

4. The webbing connector specified in claim 1, and resiliently yieldable means to hold said manipulating member in inoperative attitude relatively to said female member,
and a handle connected to said holding means for releasing said holding means and operating said manipulating member.

5. In a webbing connector,
a male connector member,
a female connector member,
means to interlock said connector members,
and releasing means to release said interlocking means at will, including
a rotatable manipulating member for operating said releasing means for moving said interlocking means into and out of interlocking positions,
means to lock said manipulating member in the locking position of said releasing means,
said manipulating member including a guide slot in said female body adjacent said manipulating member, said slot having an arcuate portion substantially concentric with the center of rotation of said manipulating member, and at least one locking slot portion at angle to said arcuate slot portion,
a guide on said manipulating member engaged in and riding in said slot, said locking slot portion being at such angle as to obstruct said guide against rotating movement of said manipulating member,
and handle means to shift said guide into said arcuate slot portion and to rotate said manipulating member.

6. In a web connector,
a male connector member,
a female connector member having a pocket therein,
a prong on the male connector member insertable into said pocket,
said prong having a keeper recess on an edge thereof,
a cam-like lock in a side of said pocket in registry with said keeper recess,
means to turn the lock into and out of said keeper recess,
said means including
a cover for said pocket having a substantially U-shaped slot therein,
a pin fixed in said lock and journalled in said cover and extended therethrough,
a manipulating frame superimposed on said cover and secured to said pin, whereby the turning of said frame turns said pin and said lock into and out of locking position,
a guide on said frame riding in said slot,
the middle portion of said slot being arcuate centered about said pin, whereby said guide in the end portions of said U-shaped slot prevents the turning of said frame,
said guide being slidable in said frame from either end portion of said U-shaped slot to said arcuate middle portion,
resilient means to urge said guide into said end portions,
handle means on said frame connected to said guide for manually sliding said guide and for turning said frame.

* * * * *